United States Patent Office 3,472,219
Patented Oct. 14, 1969

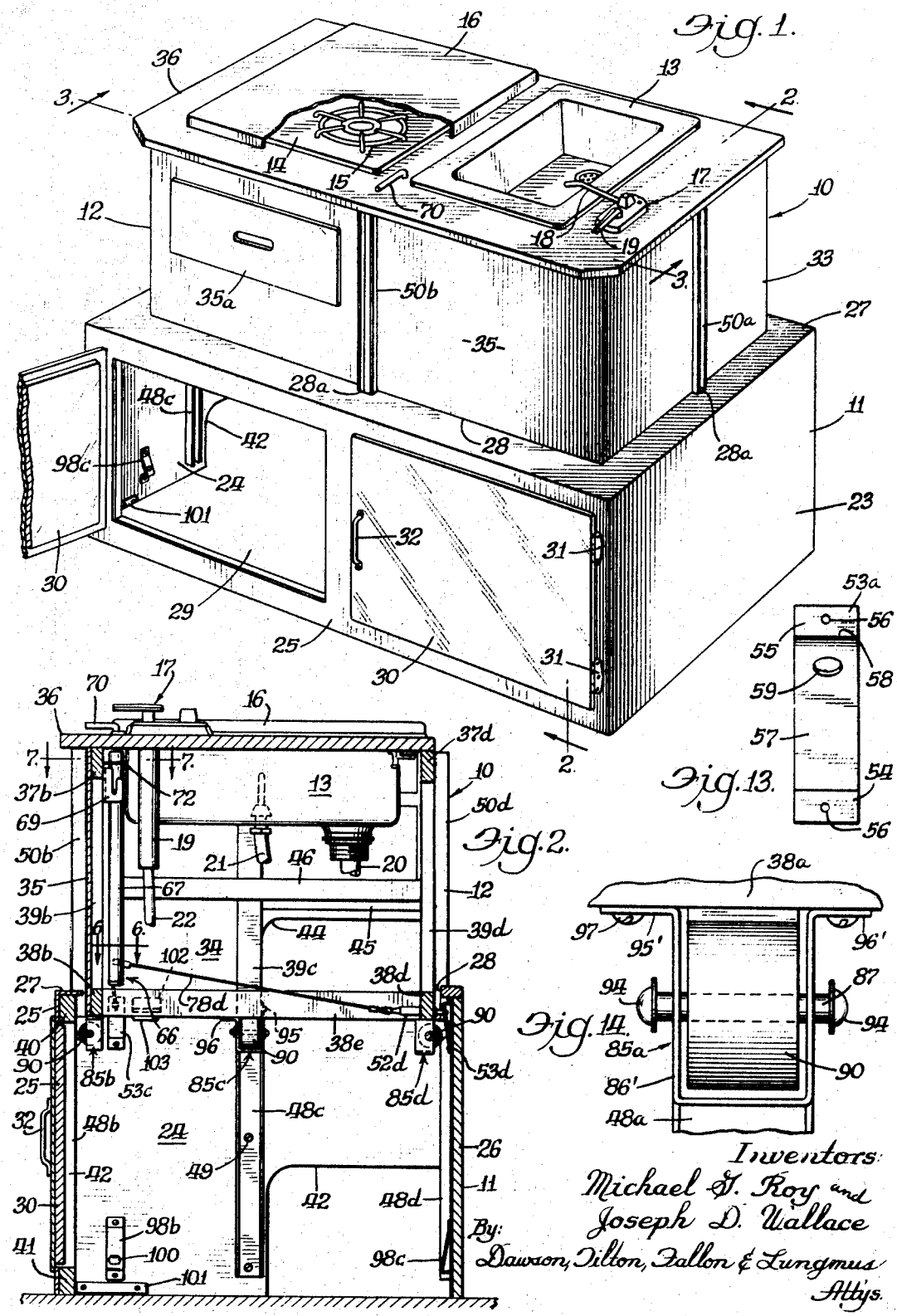

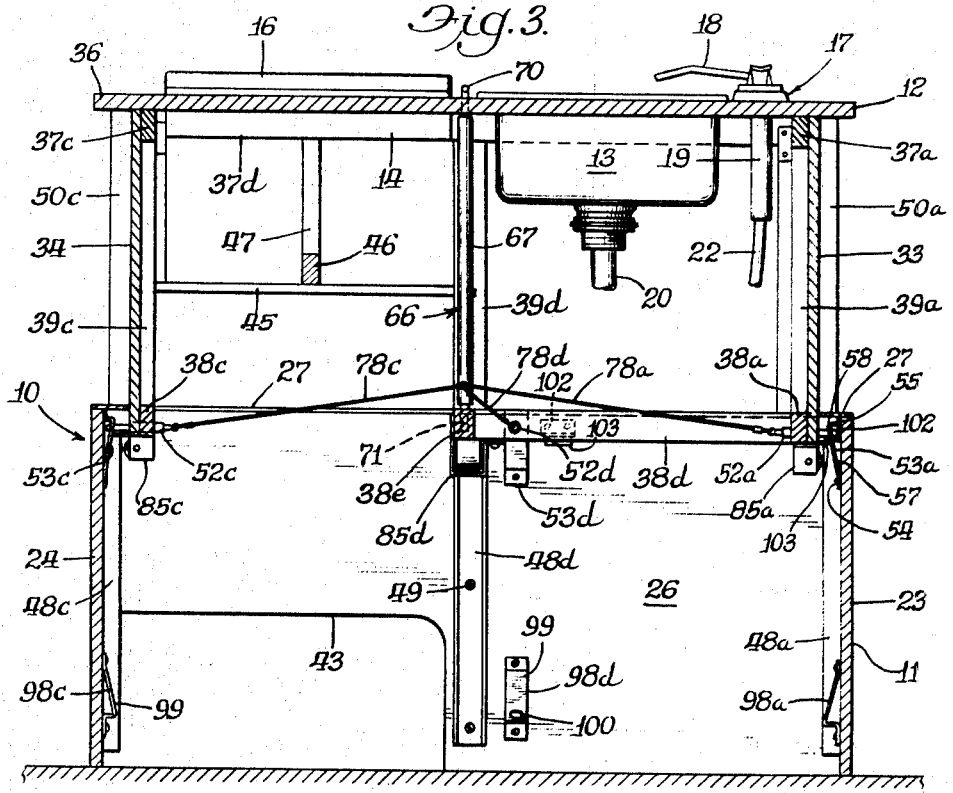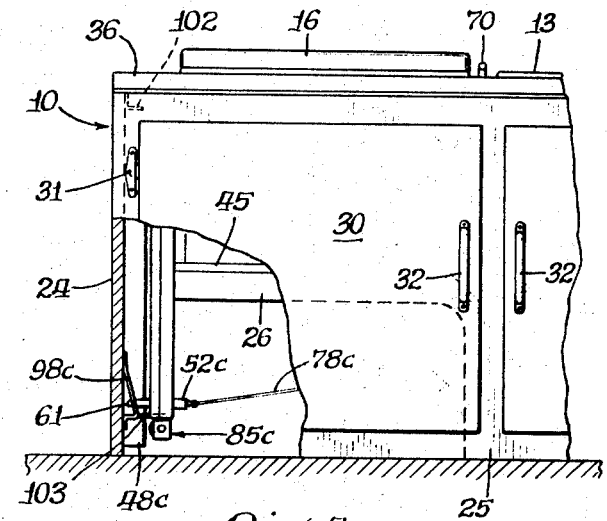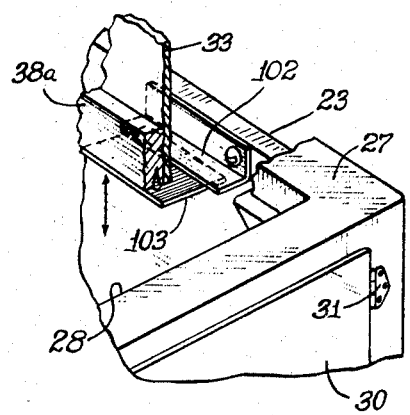

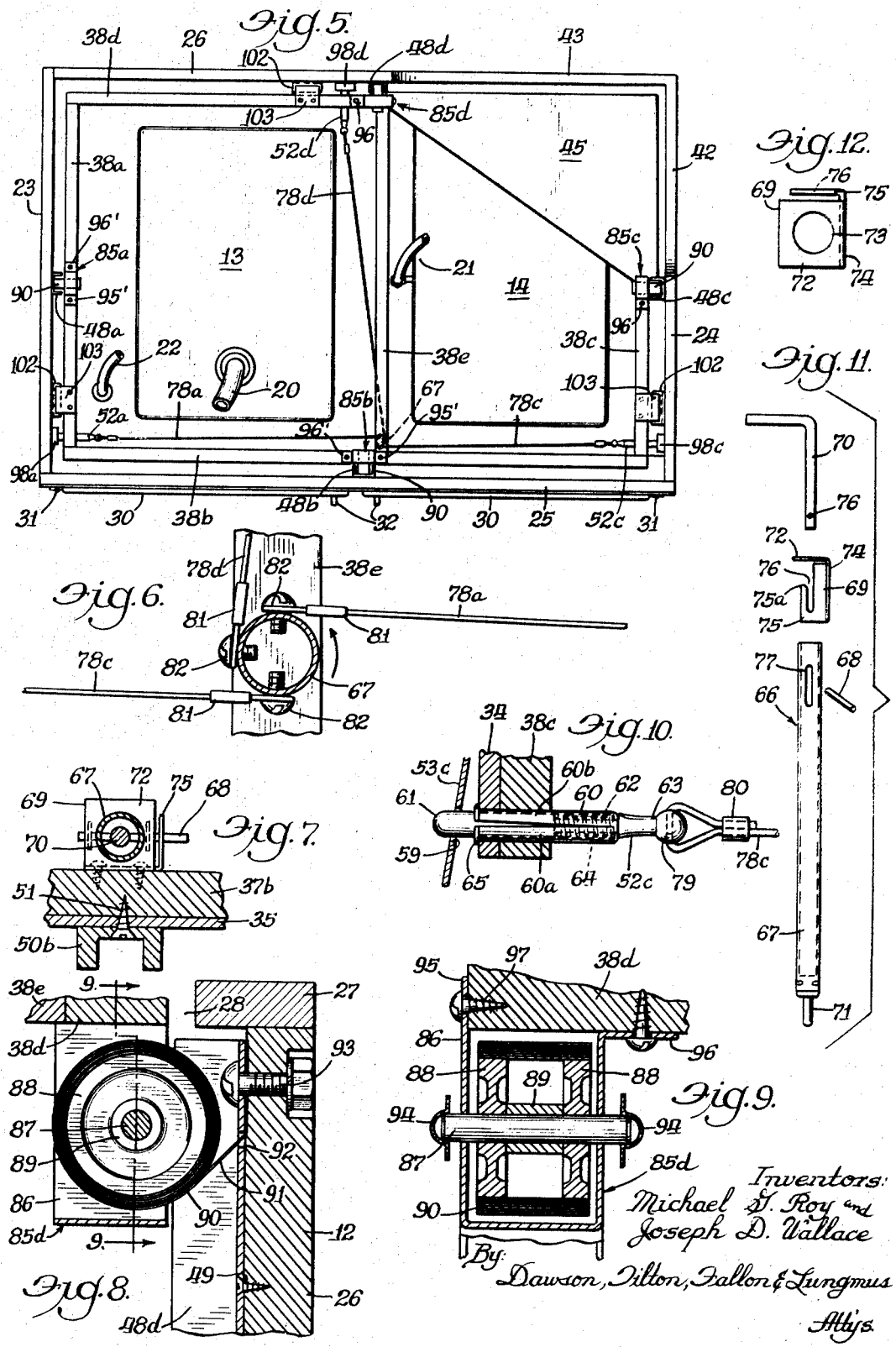

3,472,219
COLLAPSIBLE GALLEY ASSEMBLY
FOR TRAILER
Michael G. Roy and Joseph D. Wallace, Wichita, Kans.,
assignors to The Coleman Company, Inc., Wichita,
Kans., a corporation of Kansas
Filed Feb. 23, 1968, Ser. No. 707,509
Int. Cl. F24c *15/00, 15/30;* A47b *51/00*
U.S. Cl. 126—37                                       14 Claims

ABSTRACT OF THE DISCLOSURE

A collapsible galley assembly for use in camping trailers and the like. The galley assembly includes a box-like lower frame and a box-like upper frame which is slidably received by the lower frame and which carries the usual sink, stove, and the like. The lower frame is provided with a plurality of vertically extending guide channels which slidably receive vertically extending guide members on the upper frame. A plurality of locking pins are carried by the upper frame which are retractable from a locking position in which they engage catch brackets attached to the lower frame, and the locking pins are attached by cables to a central release tube which is rotatably mounted in the upper frame. Rotation of the release tube causes retraction of the locking pins and permits vertical sliding movement of the upper frame between a raised or use position and a lowered or storage position. A plurality of roll springs are rotatably mounted on the upper frame, and the outer end of each roll spring is secured to the lower frame. The roll springs exert a substantially constant lifting force on the upper frame as the upper frame moves between the raised and lowered positions, and the total force exerted by all of the roll springs approximates the weight of the upper frame.

BACKGROUND OF THE INVENTION

This invention relates to a galley assembly, and, more particularly, to a collapsible galley assembly for use in camping trailers and other trailers.

Camping trailers, travel trailers and the like are becoming increasingly popular for use on vacation trips, hunting and fishing trips, etc. These trailers are generally designed to provide comfortable eating and sleeping quarters in a relatively compact space so that the trailer may be readily towed by a car or truck. It is desirable that the various components of the trailer be as compact as possible while still efficiently serving their intended function. In order to conserve space many of the internal components of the trailer are designed to be adjustable or retractable into a more compact configuration when not being used. For example, beds may fold into and out of use as the occasion demands, and the galley or kitchen facility may also have a use and storage position.

Adjustability is particularly important in camping trailers. This type of trailer generally includes a relatively shallow box-like fixed frame carried by a pair of wheels, and a tent-like canopy may be mounted on top of the frame to provide an enclosure for sleeping, eating, and relaxing. When the trailer is to be towed to another camp site, the canopy is disassembled, folded, and placed within the relatively shallow fixed frame. It is believed that this type of trailer is well known in the art, and a detailed description is unnecessary.

Any of the internal components of the camping trailer, such as the beds, the refrigerator, and galley, must either be permanently located below the relatively short side walls of the fixed frame, or must be capable of being readily repositioned below the side walls so that the camping trailer may assume its compact, traveling configuration.

The galley unit of the camping trailer has presented a particular problem. These galley units generally include a sink and a gas stove and may also include a counter top for providing a working area for the cook. When the galley is being used, the top thereof should preferably extend at about waist level for the cook to provide maximum comfort while preparing the meal. However, the top of the fixed side walls of the trailer frame are generally well below waist level, and some means must be provided for repositioning the top of the galley below the side walls when the trailer is to be towed. These galley units are usually relatively heavy, and, since camping is becoming more and more of a family sport or recreation, moving the galley between the storage and use positions should be made as easy as possible so that even a woman or child can perform this operation. It is also desirable to be able to assemble and disassemble the camping trailer as quickly as possible to allow maximum time for enjoying the trailer.

SUMMARY OF THE INVENTION

The inventive galley assembly may be quickly and easily moved by a single person between the storage position, in which the top of the galley is relatively low, and the use position, in which the top of the galley is at a convenient working height. The galley is securely locked in either of the desired positions, and the galley position may be changed by exerting only a slight positive force.

DESCRIPTION OF THE DRAWING

FIG. 1 is a perspective view of the inventive galley assembly in the use position;

FIG. 2 is a side elevational sectional view taken along the line 2—2 of FIG. 1;

FIG. 3 is a front elevational sectional view taken along the line 3—3 of FIG. 1;

FIG. 4 is a partially broken fragmentary front elevational view of the galley in the storage position;

FIG. 5 is a bottom plan view of the galley;

FIG. 6 is an enlarged fragmentary sectional view taken along the line 6—6 of FIG. 2;

FIG. 7 is an enlarged fragmentary sectional view taken along the line 7—7 of FIG. 2;

FIG. 8 is an enlarged fragmentary sectional view of one of the spring assemblies shown in FIG. 2;

FIG. 9 is a sectional view taken along the line 9—9 of FIG. 8;

FIG. 10 is an enlarged fragmentary view of one of the locking pins;

FIG. 11 is an exploded view of the lock release tube assembly;

FIG. 12 is a top view of the release bracket of FIG. 11;

FIG. 13 is a front elevational view of one of the upper catch brackets;

FIG. 14 is a front elevational view of one of the spring assemblies shown in FIG. 5; and FIG. 15 is a fragmentary perspective view of one of the stop brackets.

DESCRIPTION OF SPECIFIC EMBODIMENT

Referring now to FIG. 1, the numeral 10 designates generally a galley assembly which includes a lower galley frame 11 and an upper galley frame 12. The galley assembly 10 is shown in the use or raised position in FIG. 1, and the upper frame 12 is seen to carry the usual sink 13 and stove 14 provided with one or more gas burners 15. The stove may be provided with a removable cover 16, if desired, to protect the burners when not in use and to provide a working counter for preparing meals. A faucet assembly 17 is also mounted on the upper frame 12 adjacent the sink and includes a spigot 18 and water pump 19. Referring to FIGS. 2 and 5, the sink 13 is provided with a drain hose 20, the stove 14 is provided with a gas supply tube 21, and the water pump 19 is provided with a water supply hose 22. The gas supply tube is connected to a suitable gas source (not shown) such as bottled propane or the like, and the water supply tube 22 is connected to a suitable water source (not shown).

Referring to FIGS. 1–3, the lower frame 11 is generally box-like in shape and includes side walls 23 and 24, front and back walls 25 and 26, respectfully, and top wall 27 having a generally rectangular opening 28. If desired, the front wall 15 may be provided with one or two openings 29 (FIG. 1) which may be covered by doors 30 hingedly secured to the lower frame 11 by hinges 31. Handles 32 attached to the doors 30 permit easy opening of the doors.

Upper frame 12 includes side walls 33 and 34, front wall 35, and a top wall 36 which is provided with suitable openings to receive the sink 13 and stove 14. The top wall 36 may extend outwardly somewhat beyond the upper frame walls 33–35. If desired, the front wall 35 may be provided with a drawer opening to receive drawer 35a for storing cooking utensils.

The upper frame 12 is reinforced at the juncture between the top wall 36 and the generally vertically extending walls 33–35 by the horizontally extending slats 37a, 37b, 37c, and 37d, and the perimeter of the bottom of the upper frame 12 is reinforced by horizontally extending slats 38a 38b, 38c, and 38d. Another horizontal slat 38e interconnects slats 38b and 38d. The horizontally extending slats 37a–37d and 38a–38d are interconnected by vertically extending slats 39a, 39b, 39c, and 39d, which are located approximately in the middle of each of the sides of the upper frame. The four corners of the upper frame may also be reinforced with vertical slats, if desired.

Similarly, the lower frame 11 is reinforced at the juncture of the front wall 25 and top wall 27 by horizontally extending slat 40 and reinforced along the bottom by horizontally extending slat 41. The ends of slats 40 and 41 may be interconnected by vertically extending slats 42 (FIG. 2).

Because of the relatively small enclosure provided by the side walls of the fixed frame of a camping trailer, it frequently is desirable to locate the galley unit over the wheel well of the trailer to make use of what might otherwise be relatively unusable space. For this purpose, we have cut away the side wall 24 of the lower frame 11 as at 42 (FIGS. 1 and 2) and have cut away the back wall 26 of the lower frame as at 43 (FIG. 3) so that the left rear corner of the galley as viewed in FIG. 3 may be positioned over the wheel well of the trailer.

Similarly, the side wall 34 of the upper frame 12 is cut away as at 44 (FIG. 2). The horizontal frame members 38c extends only between the front wall 35 and the vertical frame member 39c, and the horizontal frame member 38d extends only from side wall 33 to vertical frame member 39d (FIG. 5). The lower left-hand corner of the upper frame as viewed in FIG. 3 is reinforced by generally triangularly shaped horizontally extending plate 45 positioned just above the cut away portion of the side wall 34. Further reinforcement may be provided by fore and aft horizontally extending frame member 46 (FIGS. 2 and 3) and vertically extending frame member 47 (FIG. 3) which extends between slats 46 and 37d. The fore and aft frame member 46 also seems to slidably support drawer 35a.

The opening 28 in the top wall 27 of the lower frame is only slightly larger than the horizontal cross section of the upper frame so that the upper frame fits rather snugly within the opening and may slide vertically relative to the lower frame. The sliding vertical movement of the upper frame is guided by vertically extending guide channels 48a, 48b, 48c and 48d, which are attached to the side wall 23, front wall 25, side wall 24, and rear wall 26 of the lower frame, respectively, by means of screws 49. As can be seen best in FIG. 8, the openings provided in the web portions of the guide channels for the attaching screws 49 have inclined surfaces which mate with the correspondingly shaped heads of the screws so that the top of each head is flush with the web portion of the channel.

The guide channels receive vertically extending guide members 50a, 50b, 50c, and 50d attached to the upper frame 12. The guide member 50a is attached to the side wall 33, the guide member 50b is attached to the front wall 35, the guide member 50c is attached to the side wall 34, and the guide member 50d is attached to vertical frame member 39d (FIG. 2). Referring to FIG. 7, the guide members 50a–50d are generally channel-shaped and are secured to the upper frame 12 by screws 51. The guide members may, however, be rectangular in cross section if desired. The guide members are received rather snugly within the guide channels of the lower frame so that horizontal or tipping movement of the upper frame relative to the lower frame is restrained, and the top wall 27 of the lower frame is provided with notches 28a to accommodate the guide members (FIG. 1).

The upper frame 12 is releasably locked in the raised or use position illustrated in FIG. 1 by means of locking pins 52a, 52c, and 52d (FIG. 5). Locking pin 52a extends through horizontal upper frame member 38a adjacent the front thereof, locking pin 52c extends through an opening provided in frame member 38c adjacent the front thereof, and locking pin 52d extends through an opening provided in frame member 38d adjacent the connection thereof to frame member 39d. Each of the locking pins is seen to engage an upper catch bracket which is secured to the lower frame adjacent the top thereof, locking pin 52a engaging catch bracket 53a, locking pin 52c engaging catch bracket 53c, and locking pin 52d engaging catch bracket 53d. Bracket 53a is attached to side wall 23, bracket 53c is attached to side wall 24, and bracket 53d is attached to rear wall 26.

Referring to FIGS. 3 and 13, each of the upper catch brackets, for example bracket 53a, includes a pair of generally flat end portions 54 and 55 provided with suitable screw opening 56, an inclined middle portion 57 which extends from end portion 54 away from the lower frame wall to which the bracket is attached, and a horizontal portion 58 connecting the middle portion 57 to the end portion 55. The upper end of the middle portion 57 is provided with an opening 59 which receives the end of the associated locking pin and prevents vertical movement of the pin.

Referring to FIG. 10, the locking pins may be of the type available from Stanley Hardware, Part No. 1697. Each locking pin includes an outer expandable casing 60 which is secured within the opening provided through the upper frame 12. The frame opening is made somewhat smaller than the normal outside diameter of the locking pin so that when the outer casing 60 is inserted through the opening, the expandable halves 60a and 60b of the outer casing are somewhat pinched together, thereby providing a relatively tight fit within the opening. Pin 61 is received by the outer casing 60, and shaft 62 connects pin 61 to the end portion 63 of the locking pin. Coil spring 64 is carried by the shaft 62 and is interposed between the inner end of pin 61 and one end of the casing 60. The pin 61 may be disengaged from its associated catch bracket by pulling end portion 63 to the right as viewed in FIG. 10 against the urging of spring 64. Perimetric flange 65 on the end of the outer casing will prevent the movement of the outer casing to the right.

All three of the locking pins may be disengaged from their associated catch brackets substantially simultaneously by means of release tube assembly 66 (FIGS. 2 and 3) which extends between the upper frame member 38e and the top wall 36 of the upper frame. Referring to FIG. 11, release tube assembly 66 includes an elongated generally cylindrical hollow shaft 67, a pin 68, release bracket 69, an L-shaped handle 70, and a generally cylindrical stud 71 secured to the lower end of the shaft 67. Release bracket 69 includes a flat top portion 72 provided with a central opening 73 (FIG. 12). The top 72 is connected to a vertical side portion 74, which is in turn connected to another generally vertical side portion 75 which extends generally at right angles with side 74. A generally L-shaped slot 76 is provided in side portion 75 and defines a vertical finger portion 75a.

The diameter of the opening 73 in the top of the release bracket is slightly larger than the diameter of the shaft 67. As can be seen best in FIG. 2, the upper end of shaft 67 is inserted through the opening 73, and the stud 71 is rotatably received by a hole drilled in frame member 38e. Release bracket 69 is secured to frame member 37b of the upper frame, the vertical portion of the L-shaped handle 70 is received by the upper end of the shaft 67, and pin 68 is inserted through vertical slot 77 provided in the shaft 67 (FIG. 11) and secured within the opening 76 provided in handle 70. The vertical slot 77 of the shaft 67 is positioned so that the bottom thereof is located approximately even with the bottom of slot 76 of the release bracket. The vertical portion of handle 70 passes through an opening provided in the top wall 36 of the upper frame, and the slots 76 and 77 permit the pin 68 and handle 70 to be moved up and down.

The release tube assembly 66 is connected to the locking pins 52a, 52c, and 52d by cables 78a, 78c, and 78d, respectively. Referring to FIG. 10, one end of each cable is looped through an opening 79 provided in the end portion 63 of the locking pin, and the loop is secured by a clamp 80. Similarly, the other end of each cable is reversely folded and secured by a clamp 81 (FIG. 6) to form a loop which is secured to the shaft 67 of the release tube assembly by screws 82.

When it is desired to disengage the locking pins from the upper catch brackets, the handle 70 is lifted upwardly until the pin 68 is above the top of the finger portion 75a of the release bracket. The handle 70 may then be rotated to move the pin 68 out of the release bracket slot 76, and, since the pin 68 is confined within the slot 77 of the shaft 67, the rotation of the pin causes rotation of the shaft. Referring to FIG. 6, rotation of the shaft 67 in the direction of the arrow will draw the release cables away from the outer casings 60 of their associated locking pins, thereby withdrawing the pin ends 61 from the openings 59 of the catch brackets. When the rotational force applied to handle 70 is released, the springs 64 of the locking pins cause the shaft 67 to return to its original position.

Spring assemblies 85a, 85b, 85c, and 85d are secured to the upper frame 12 below the vertical guide members 50a–50d. Referring to FIG. 5, spring assembly 85a is attached to the bottom of vertical frame member 38a, spring assembly 85b is attached to frame member 38b, spring assembly 85c is attached to frame member 38c, and spring assembly 85d is attached to frame member 38d. Referring to FIGS. 8 and 9, each spring assembly, for example spring assembly 85d, includes a generally U-shaped spring retaining bracket 86 in which is journaled spring shaft 87. A pair of pulleys 88 are slidably received by shaft 87 and are spaced apart by cylindrical spacer 89, and a roll spring 90 is carried by the pulleys 88.

The roll springs are of a type available from Hunter Spring Company, No. SH 16P38, and provide a constant load force, i.e., when the spring is unwound it will exert a constant force tending to rewind itself regardless of the extent to which the spring is unwound. For example, in one specific embodiment of the invention the width of the rolled band was 1 inch, the length of the band was 38 inches, and the load pound value of the spring was 10.6. Thus, as the outer end 91 of the spring is pulled away from the spring shaft 87 causing the spring to unwind, a substantially constant force of 10.6 pounds is exerted by the spring. This is in contrast to ordinary springs, in which the force exerted by the spring is directly proportional to the amount of deflection of the spring.

Referring to FIG. 8, the outer end 91 of each of the roll springs 90 is passed through a slit 92 provided in the upper end of each of the guide channels 48a–48d and is anchored between the upper end of the guide channel and the wall of the lower frame 12 by means of a bolt 93 which is passed through the guide channel, the spring end, and the lower frame. The inner end of the springs are suitably secured to the pulleys 88. Thus, as the upper frame is lowered within the lower frame, the spring assembly 85d moves downwardly in FIG. 8, and the spring 90 is caused to unwind. The spring shaft 87 may be secured within the spring retaining bracket 86 by caps 94 which are punched onto the chamfered ends of the shaft.

The spring retaining bracket 86 of the spring assembly 85d illustrated in FIGS. 8 and 9, is secured to frame member 38d which terminates approximately midway along the length of the upper frame to accommodate the wheel well of the trailer. The spring retaining bracket 86 is therefore provided with one generally vertical attaching flange 95 and one generally horizontal attaching flange 96 which are secured to the end and the lower side, respectively, of frame member 38d by screws 97 (FIG. 9). Similarly, the spring retaining bracket of spring assembly 85c is secured to frame member 38c, which also terminates approximately midway along the width of the upper frame (FIG. 5), and this bracket is also provided with one vertical attaching flange and one horizontal attaching flange. However, the spring retaining brackets of spring assemblies 85a and 85b are attached to frame members 38a and 38b which extend along the entire width and length, respectively, of the upper frame (FIG. 5). Referring to FIG. 13, the spring retaining brackets of these spring assemblies are provided with a pair of vertical attaching flanges. Spring assembly 85a is illustrated in FIG. 13, and the generally U-shaped spring retaining bracket 86′ is seen to include two opposed horizontal attaching flanges 95′ and 96′ which are secured to frame member 38a by screws 97. With the exception of the configuration of the attaching flanges of the spring retaining brackets, spring assemblies 85a–85d are identical, spring assembly 85a also including roll spring 90 journaled within the retaining bracket by spring shaft 87.

Lower catch brackets 98a, 98c, and 98d are attached to the lower frame adjacent the bottom thereof and are generally vertically aligned with upper catch brackets 53a, 53c, and 53d, respectively. Referring to FIG. 3, each of the lower catch brackets has the same general shape as the upper catch brackets, but inclined middle portions 99 of the lower catch brackets slope downwardly and outwardly from the lower frame walls rather than upwardly and outwardly. The inclined middle portions 99 of the lower catch brackets are also provided with openings 100 adapted to receive the ends of the locking pins.

Generally triangularly shaped reinforcing brackets 101 (FIGS. 1 and 2) may reinforce the front corners of the lower frame if desired. These reinforcing brackets are omitted in FIG. 5 for the purpose of clarity.

As can be seen best in FIGS. 5 and 15, the lower frame 11 includes a plurality of L-shaped stop brackets 102 which are secured to the frame walls. The stop brackets extend inwardly and are engageable with stop plates 103 which are secured to the bottom of the upper frame 12 to prevent excessive upward movement of the upper frame. We have found that it is desirable to provide a stop bracket and a stop plate adjacent each of the locking pins 52a, 52c, and 52d. The stop bracket illustrated in FIG. 15 is secured to the side wall 23, and the stop plate is secured to the upper frame member 38a. Similarly, stop brackets are secured to the walls 24 and 26 of the lower frame, and stop plates are secured to upper frame members 38c and 38d.

OPERATION

When the galley is to be used for cooking, washing, and the like, the upper frame is maintained in the raised or use position illustrated in FIG. 1. The weight of the upper frame is supported by the locking pins 52a, 52c, and 52d, which engage the upper catch brackets 53a, 53c, and 53d, respectively. In this position, the top wall 36 of the upper frame, the stove burners 15, and sink 13 are positioned conveniently at about waist height for the cook. The lower frame enclosure provides storage space for pots, pans, and other utensils, which may be removed by opening the cabinet doors 30.

When the trailer is to be disassembled for towing or when additional space within the trailer is desired, the upper frame may be moved to the lowered or storage position illustrated in FIG. 4. The handle 70 which projects through the top wall 36 is first lifted so that the pin 68 of the release tube assembly is moved upwardly within slot 76 and 77 to a position above the finger portion 75a of the release bracket. The pin 68 is then free to rotate out of the slot 76, and rotation of the handle 70 pulls the release cables 78a, 78c, and 78d and their associated locking pin ends 61 away from the upper catch brackets. When the pin ends are withdrawn from the openings provided in the upper catch brackets, the upper frame 12 may be moved downwardly slightly and the handle 70 released.

The roll springs 90 of the spring assemblies are designed to exert a combined total force of approximately the weight of the upper frame, and the weight of the upper frame need not be supported by the operator when the locking pins are disengaged. Only a slight downward force applied to the upper frame is needed to cause the retracted pin ends to be moved downwardly below the upper catch bracket openings, after which the handle 70 may be released. The slight downward force is continued to be applied to the upper frame until the locking pin ends 61 are received by the openings 100 of the lower catch brackets 98a, 98c, and 98d. The inclined middle portions 99 of the lower catch brackets will push the locking pin ends 61 inwardly as the pin ends approach the openings so that rotation of the release tube shaft is not required to lock the upper frame in the lowered position. As the pin ends reach the openings 100 they automatically are forced into the openings by the locking pin springs 64. The lower frame is thus securely locked in place and safeguarded against the jolting and bouncing the trailer receives as it is being towed.

As the upper frame moves downwardly, the roll springs 90 unwind but continue to exert a substantially constant upward force on the upper frame which approximates the weight of the upper frame. Thus, even when the upper frame approaches its lowered position, the springs do not exert any substantial force tending to lift the upper frame which may result in an injury or an accident if the operator's hands should happen to slip from the top wall of the upper frame.

When the galley is in the storage position, the top of the upper frame is positioned below the top of the side walls of the fixed frame of the camping trailer, and the tent-like canopy of the trailer may be disassembled and the camping trailer top attached to the side walls to form a compact towing configuration. Even when the upper frame is in the storage position, substantial storage space is available within the lower frame enclosure. Referring to FIG. 4, the space between the bottom of the lower frame or the trailer floor and the reinforcing plate 45 of the upper frame is available for storage, and similarly, the space between the floor and the bottom of the sink 13 is available for storage on the right hand side of the galley.

When the upper frame is to be moved upwardly from the storage position to the use position, the handle 70 is again lifted and rotated to withdraw the locking pin ends 61 from the lower catch brackets. Since the weight of the upper frame is substantially supported by the roll springs 90, only a slight lifting force need be applied to the upper frame to move the upper frame upwardly. As the locking pin ends engage the inclined middle portions 57 of the upper catch brackets, they are pushed inwardly until they reach the bracket openings 59 and secure the upper frame in the use position. The outward projection of the top wall 36 of the upper frame beyond the upper frame walls 33–35 provide a convenient lifting location for the operator's hands.

The stop brackets 102 and stop plates 103 ensure that the upper frame will not inadvertently be pulled too far upwardly if the locking pins do not for some reason engage the bracket opening 59. Preferably, the stop brackets and plates are positioned so that they are engageable just after the locking pins would pass above the bracket openings 59.

While the spring assemblies 85a–85d in the particular embodiment illustrated are located below the guide members 50a–50d of the upper frame so that the roll spring 90 and pulleys 88 extend somewhat into the guide channels (FIG. 8), it is to be understood that the spring assemblies may be located at other points beyond the upper frame. We have found, however, that aligning the spring assemblies with the guide channels and guide members as illustrated results in a rather uniform lifting force applied to the upper frame and maintains the guide members relatively vertically within the guide channels. Alternatively, the spring assemblies may be attached to the lower frame and the spring ends 91 may be attached to the upper frame. In any event, the springs will exert a lifting force upon the upper frame which will enable the upper frame to be moved relative to the lower frame by applying only a slight force. Thus, even a child or woman can position the galley without difficulty.

While we have described the galley as being equipped with only upper and lower catch brackets, additional sets of catch brackets may be attached to the lower frame between the upper and lower sets, if desired, in order to position the top of the galley at several heights to accommodate the height of the cook.

While in the foregoing specification, we have set forth a detailed description of a specific embodiment of our invention for the purpose of illustration, it is to be understood that many of the details herein given may be varied considerably by those skilled in the art without departing from the spirit and scope of our invention.

We claim:

1. In a trailer, a collapsible galley assembly including a lower frame, an upper frame slidably received by the lower frame, guide means on said lower and upper frames for permitting generally vertical sliding movement of said upper frame relative to said lower frame, said upper frame being slidable between a raised and lowered position, and lock means on said frames for maintaining said upper frame in the raised position, said lock means including a plurality of locking pins on one of said frames releasably engageable with the other of said frames and release means for substantially simultaneously releasing said pins, said locking pins being retractable from a locking position to an unlocking position and being spring-biased into said unlocking position, and catch means on the other of said frames for receiving said locking pins.

2. The structure of claim 1 including a plurality of stop brackets secured to said lower frame adjacent the upper end thereof and a plurality of stop plates secured to said upper frame adjacent the lower end thereof, said stop brackets and stop plates being engageable to prevent excessive upward movement of said upper frame.

3. In a trailer, a collapsible galley assembly including a lower frame, an upper frame slidably received by the lower frame, a plurality of generally vertically extending guide tracks on one of said frames, a generally vertically extending guide member on the other of said frames slidably received by each of said guide tracks, said upper frame being slidable between a raised and a lowered position, spring means operatively associated with said upper frame for at least partially supporting the weight of said upper frame as said upper frame moves between the raised and lowered positions, and lock means on said frames for maintaining said upper frame in the raised position.

4. The structure of claim 3 in which said spring means exerts a substantially constant lifting force on said upper frame as the upper frame moves between the raised and lowered positions.

5. The structure of claim 1 in which said release means includes cable means connected to said pins for retracting said pins from said locking position.

6. The structure of claim 1 in which said release means includes a release tube rotatably mounted in said upper frame and cable means connecting said release tube and said locking pins for retracting said pins from said locking position.

7. A collapsible galley assembly adapted for use in a trailer, said galley assembly including a lower frame, an upper frame slidably received by the lower frame, guide means on said lower and upper frames for permitting generally vertical sliding movement of said upper frame relative to said lower frame, said upper frame being slidable between a raised and a lowered position, said guide means including spring means operatively associated with said upper frame for at least partially supporting the weight of said upper frame as said upper frame moves between the raised and lowered positions, and lock means on said frames for maintaining said upper frame in the raised position.

8. The structure of claim 7 in which said spring means includes a plurality of roll springs, each of said roll springs being rotatably mounted on one of said frames and providing a spring end secured to the other of said frames.

9. The structure of claim 7 in which said spring means exerts a substantially constant lifting force on said upper frame as the upper frame moves between the raised and lowered positions.

10. A collapsible galley assembly adapted for use in a trailer, said galley assembly including a lower frame, an upper frame slidably received by the lower frame, guide means on said lower and upper frames for permitting generally vertical sliding movement of said upper frame relative to said lower frame, said upper frame being slidable between a raised and lowered position, and lock means on said frames for maintaining said upper frame in the raised position, said lock means including a plurality of locking pins on one of said frames releasably engageable with the other of said frames and release means for substantially simultaneously releasing said pins, said locking pins being retractable from a locking position to an unlocking position and being spring-biased into said unlocking position, and catch means on the other of said frames for receiving said locking pins, said guide means including spring means operatively associated with said upper frame for at least partially supporting the weight of said upper frame as said upper frame moves between the raised and lowered positions.

11. The structure of claim 10 in which said guide means includes a plurality of generally vertically extending guide tracks on one of said frames, a generally vertically extending guide member on the other of said frames slidably received by each of said guide tracks, said spring means including a plurality of roll springs, each of said roll springs being rotatably mounted on one of said frames and providing a spring end secured to the other of said frames.

12. A collapsible galley assembly adapted for use in a trailer, said galley assembly including a lower frame, an upper frame slidably received by the lower frame, a plurality of generally vertically extending guide tracks on one of said frames, a generally vertically extending guide member on the other of said frames slidably received by each of said guide tracks, said upper frame being slidable between a raised and a lowered position, spring means operatively associated with said upper frame for at least partially supporting the weight of said upper frame as said upper frame moves between the raised and lowered positions, and lock means on said frame for maintaining said upper frame in the raised position, said lock means including a plurality of locking pins on said upper frame and catch means on the lower frame for receiving said locking pins, said locking pins being retractable from a locking position to an unlocking position and being spring-biased into said locking position, and release means on said upper frame for substantially simultaneously releasing said pins.

13. The structure of claim 12 in which said spring means includes a plurality of roll springs, each of said roll springs being rotatably mounted on one of said frames and providing a spring end secured to the other of said frames.

14. The structure of claim 12 in which said release means includes a release tube rotatably mounted in said upper frame and cable means connecting said release tube and said locking pins for retracting said pins from said locking position.

References Cited

UNITED STATES PATENTS 2,897,812   8/1959   Albrecht _____ 312—312 X

EDWARD G. FAVORS, Primary Examiner

U.S. Cl. X.R.

312—312